United States Patent [19]

Ahrweiler

[11] 4,050,872

[45] Sept. 27, 1977

[54] ROLLER CHAIN GUIDE ARRANGEMENT

[75] Inventor: Karl-Heinz Ahrweiler, Krefeld, Germany

[73] Assignee: Eduard Küsters, Krefeld, Germany

[21] Appl. No.: 700,346

[22] Filed: June 28, 1976

[30] Foreign Application Priority Data

Oct. 11, 1975 United Kingdom ................. 2545624

[51] Int. Cl.[2] .......................... B29C 15/00; B27D 3/04

[52] U.S. Cl. ................................ 425/371; 144/281 B; 198/628; 198/840; 425/394

[58] Field of Search ............... 100/154, 151, 152, 153, 100/93 RP; 156/583, 580; 144/281 R, 281 A, 281 B, 281 C, 281 D, 281 E, 283; 425/224, 364, 371, 394, 174.4; 198/626, 627, 628, 840

[56] References Cited

U.S. PATENT DOCUMENTS

| | | | |
|---|---|---|---|
| 3,851,685 | 12/1974 | Ahrweiler et al. .............. | 144/281 B |
| 3,881,852 | 5/1975 | Ahrweiler ......................... | 425/371 X |
| 3,926,542 | 12/1975 | Ahrweiler ......................... | 425/371 X |

*Primary Examiner*—Othell M. Simpson
*Assistant Examiner*—W. D. Bray
*Attorney, Agent, or Firm*—Kenyon & Kenyon, Reilly, Carr & Chapin

[57] ABSTRACT

In an arrangement in which a group of roller chains packed closely together, side by side, in a manner in which they can advance independently of each other, with the chains advancing parallel to each other in common plane in one area and the chains leaving the common plane at one point and thereafter following separate paths and then coming together again at an entry point for the common plane, guides are provided to prevent adjacent roller chains from running up on to each other as they return to the common plane.

5 Claims, 11 Drawing Figures

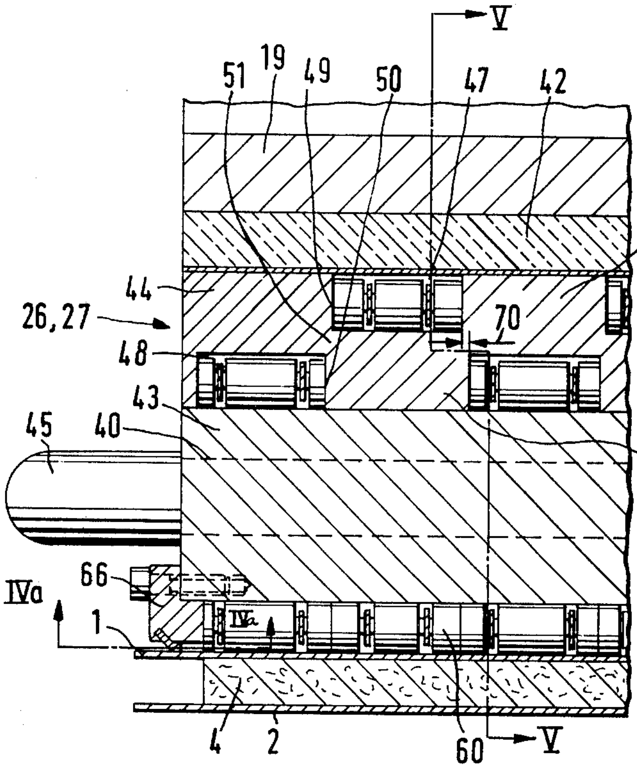
FIG.4
FIG. 4a
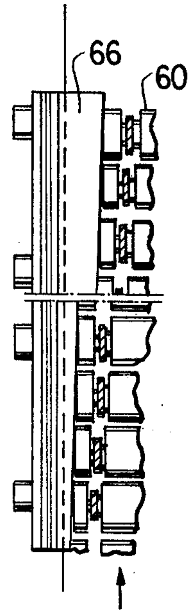
FIG.5
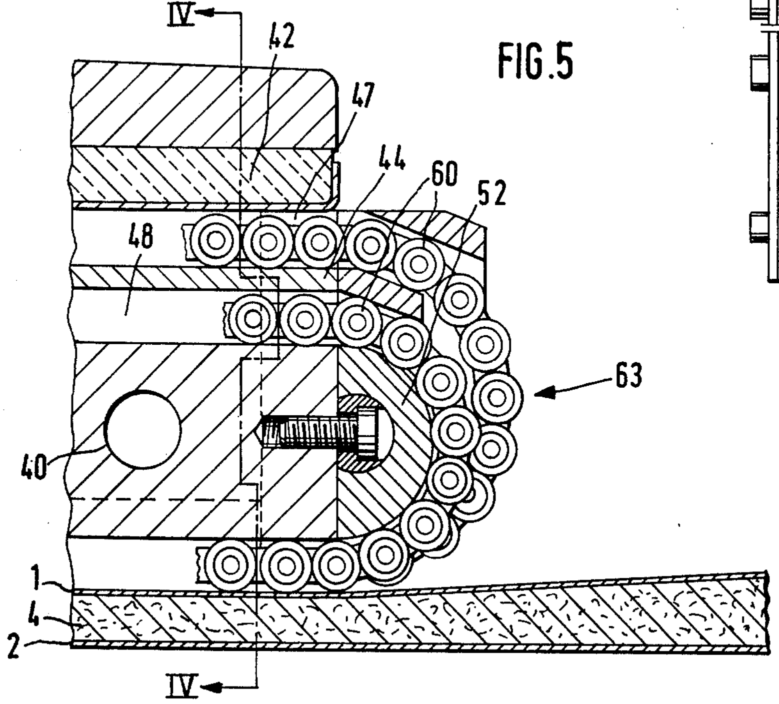

ROLLER CHAIN GUIDE ARRANGEMENT

BACKGROUND OF THE INVENTION

This invention relates to apparatus utilizing a plurality of packed endless roller chains capable of moving independently with respect to each other, which chains over a portion of their travel are separated and in another portion come together into a common plane in general, and more particularly to apparatus for preventing the chains from running up upon one another as they enter into the common plane.

A particularly important application for a plurality of packed endless roller chains arranged side by side is in the type of continuous press apparatus described in U.S. Pat. No. 3,851,685 issued to K. Ahrweiler et al on Dec. 3, 1974. In the apparatus disclosed therein, an advancing web which starts out as a plurality of wood chips or the like is conducted through the press and formed into wood chip board or a similar product. In the apparatus the web is conducted between endless conveyor belts which both revolve moving along with the web which is conducted therebetween. Pressure is applied to the conveyor belts by means of support structures, one being disposed above and one below the web of material. The conveyor belts have a width equal to that of the web and there are disposed between the support structures above and below and the two conveyor belts, two sets of closely packed roller chains with the individual chains in each group capable of moving independently with respect to other chains in the group.

The chains are used to transmit pressure from the support structure to the conveyor belts. In the apparatus disclosed the chains, after leaving the pressing area of the press, return through the support structure in channels arranged in two different planes parallel to the plane of the web.

The roller chains each contain a plurality of adjacent rollers per link with the links connected by plates disposed only on the inside between adjacent rollers. In other words, the outer rollers of each link are cantilevered on the roller pin. This permits adjoining roller chains to be directly adjacent to each other to obtain a uniform rolling action over the entire pressure area of the press. Such uniform rolling is further assured by the chain construction shown in FIGS. 9–11 of that patent in which the individual rollers of a link are offset with respect to adjacent rollers to avoid the formation of elongated gaps between rollers.

In the apparatus described in the aforementioned patent, the roller chains are returned from the end of the pressure section to its beginning through a return plate which is disposed within the support structure for the conveyor belt. The chains return through slots extending in the travel direction within the support structure. Because the roller chains are immediately adjacent, the slots cannot be arranged in a single plane, [otherwise the pressure could not properly be transmitted]. Instead, they are disposed in two planes parallel to the plane of the web. When the roller chains arrive back at the beginning of the pressure section, they must be returned from the two planes into a single plane before entering the pressure section. Because the roller chains have a certain amount of mobility and are immediately adjacent, it is possible for rollers of adjacent chains to run with their edges up on to the edges of the rollers of an adjacent roller chain as they re-enter the common plane. Although in the further course of movement they may slide off, the proper running of the roller chains is adversely effected to a considerable degree by such interference of one chain with the other.

The same problems can occur in other apparatus than the type of press disclosed in the aforementioned patent. Essentially, this can be a problem in any type of device using a plurality of closely spaced chains. For example, there are types of apparatus where over a certain area chains are caused to leave a common plane because of the individual action of separate chain tighteners on each of the individual chains. In this case also, the chains must again at some point enter a common plane and the same problems can occur.

In view of these difficulties, the need for an improved apparatus for preventing the edges of adjacent chains from rolling up onto one another as the chains re-enter a common plane becomes evident.

SUMMARY OF THE INVENTION

The present invention provides a solution to this problem. In accordance with the present invention, guide members are provided for spacing the roller chains apart from each other transversely to the travel direction of the group of chains before the roller chains re-enter the common plane after once having left that plane. Thus, while the roller chains run immediately adjacent to each other in the working strand, i.e. during the transmission of pressure and in some cases heat, they are spread apart laterally in the return strand, at least in the area immediately before re-entry into the common plane. As a result sufficient spacing exists during the re-entry preventing the edges from running up onto each other due to the play which results from the mobility of the roller chains. The spacing need only correspond to the expected range of lateral displacement of the lateral boundaries of the roller chains. In a typical embodiment, in which roller chains have three rollers per link and are about 55 mm wide and in which the rollers have a diameter of 12.5 mm, spacing on the order of 0.8 mm is sufficient to insure trouble free re-entry of the roller chains.

In one embodiment illustrated herein the guide members are stationary guide bodies with lateral guide surfaces. The guide bodies spread the roller chains apart laterally by the required amount prior to their re-entry. In a press such as that described in the aforementioned patent, the guide members are designed as shaped pieces which are bolted onto the exit of the return plate located at the beginning of the pressure section. In accordance with a further feature of the disclosed invention, convergence members which are arranged to bring the chains together in the area of these members gradually until the roller chains are close together for re-entry into the pressure section are also provided. This arrangement acts to counter-act the tendency of the roller chains to retain the spacing imparted to them by the guide members and to urge them back into a closely packed condition. As illustrated, the convergence members will preferably by guide pieces arranged on both sides of a group of roller chains which engage the outermost chains of the group. Also illustrated is the use of guide rollers which revolve about an axis perpendicular to the plane of the group of chains, the guide rollers rolling on the outermost chains of the group.

As illustrated, the convergence members are designed and placed such that they urge the group of chains together i.e., they funnel them into the desired packing.

To accomplish this, the guide pieces have an extended, obliquely arranged sliding surface or the guide rollers have a sufficiently large diameter so that convergence does not occur too abrutly. Alternatively, a plurality of guide rollers are arranged in a staggered fashion one behind the other.

BRIEF DESCRIPTION OF THE DRAWINGS

FIG. 4 is a partial cross section of the outer zone of the pressure section of the press of FIG. 3.

FIG. **4*a* is a view of the convergence guide member utilized in the embodiment of FIG. 4**.

Figures 1, 2, 3:
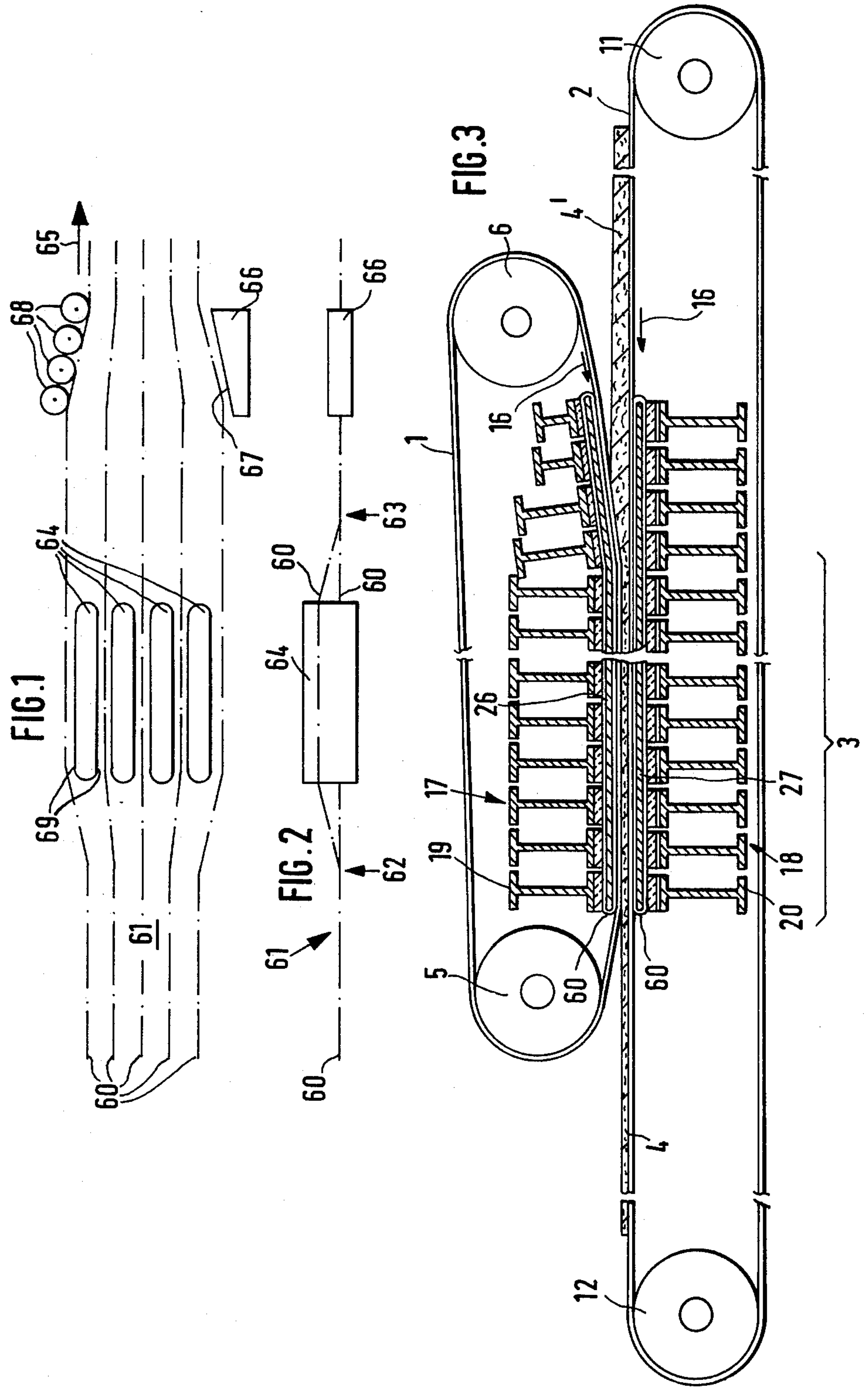
FIG. 1 is a plan view in schematic form of a running group of chains showing the guide means of the present invention.
FIG. 2 is a side schematic view of the arrangement of FIG. 1.
FIG. 3 is a schematic side view of a continuous press for the production of wood chip board or the like in which the present invention is installed.

FIG. 5 is a partial longitudinal cross section through the beginning portion of the pressure section of the press of FIG. 3.

Figure 6:
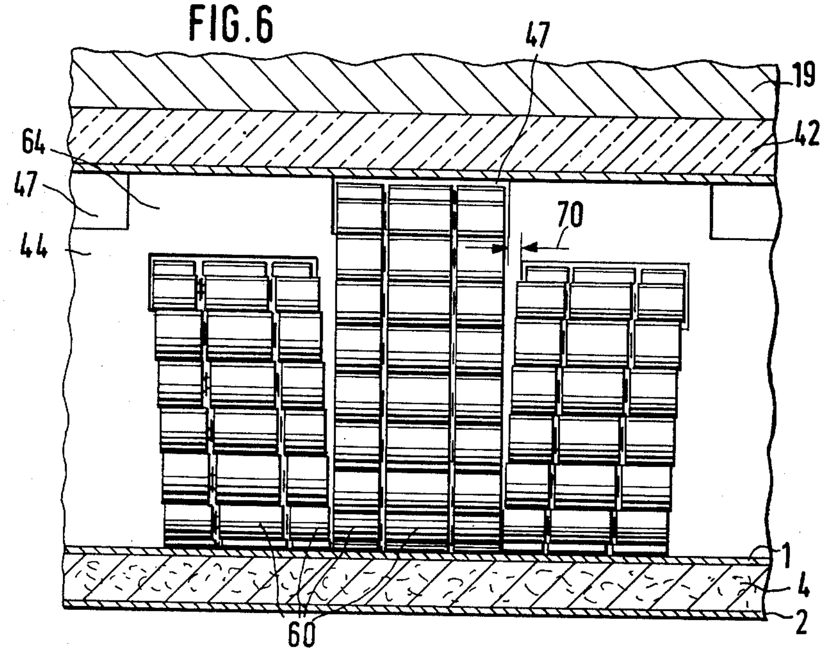

FIG. 6 is an end view partially in cross section of the beginning portion of the pressure section.

Figure 7:
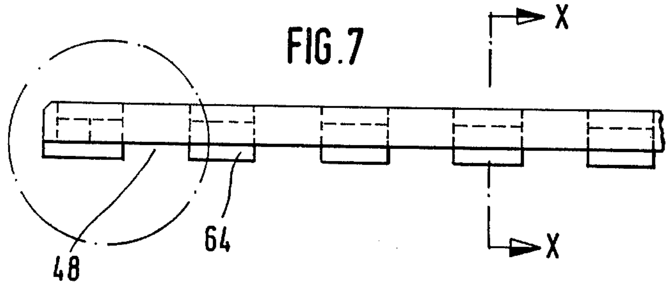

FIG. 7 is a front view of the end of the return plate on the entry end shown on a smaller scale and without roller chains.

Figure 8:
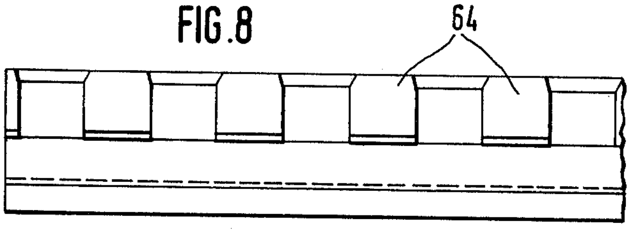

FIG. 8 is a plan view of what is shown on FIG. 7.

Figure 9:
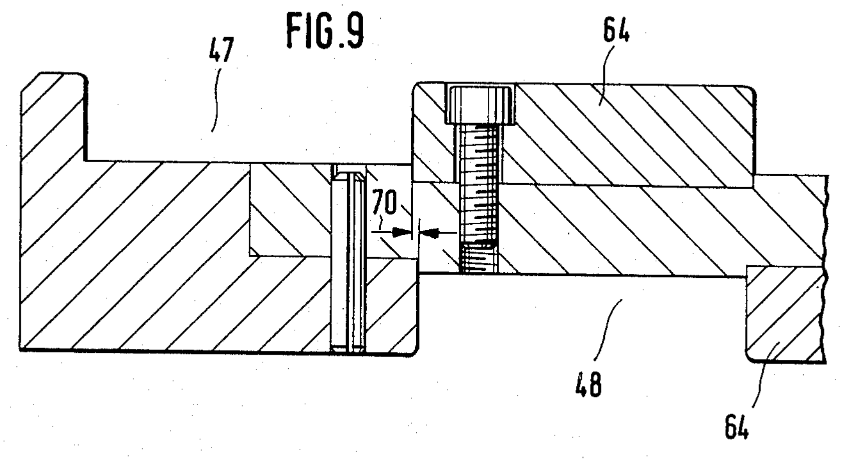

FIG. 9 is a cross section through the region circled in FIG. 7 on an enlarged scale.

Figure 10:
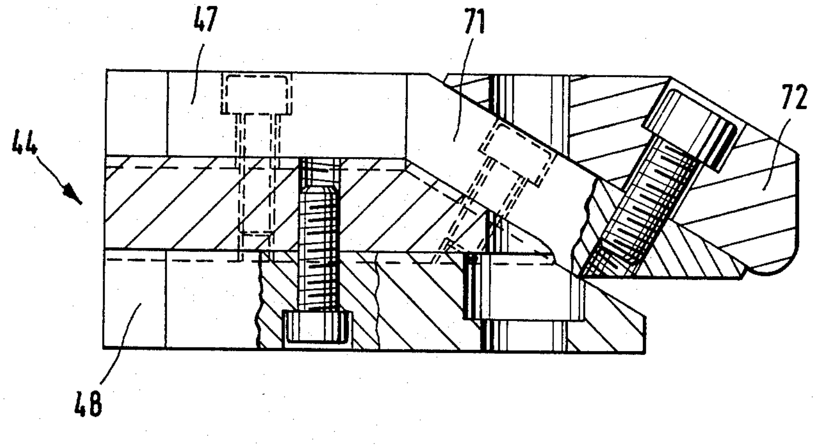

FIG. 10 is a cross section taken along the line X—X of FIG. 7 on an enlarged scale.

DETAILED DESCRIPTION OF THE PREFERRED EMBODIMENT

FIG. 1 is a schematic plan view helpful in illustrating the principle of the present invention. Shown as dash-dot lines are a plurality of five roller chains 60 running side by side. In the roller chains, each link has a plurality of rollers running side by side with the outer rollers cantilevered. Thus, the outer rollers of adjoining roller chains 60 are immediately adjacent to each other. The roller chains 60 can advance freely and independently of each other. Together they form an area 61 which is a common plane in the illustrated example of FIG. 1.

As illustrated by FIG. 2, at the point 62 some of the roller chains 60, e.g. the first, third and fifth roller chain from the bottom as shown on FIG. 1, rise from the plane 61 and run a certain distance above the plane 61. At a point 63, the roller chains return to the plane 61. In this process, they merge between the roller chains which remain in the plane 61.

In order that the edges of the roller chains 60 cannot run up onto each other in this process, guide members 64 are provided which spread the roller chains 60 apart to a larger spacing so that they cannot touch each other when they return. The increase in spacing is exaggerated as shown in FIG. 1. In actuality, it need be made only large enough so that the possible lateral displacements of the freely running roller chains are taken into account. As noted above, these roller chains are themselves movable and not strictly guided. The guide members 64 are in the form of stationary guide bodies having lateral guide surfaces 69.

After passing the point 63, the roller chains 60 are once again in the plane 61. However, there are still spaced transversely to the travel direction 65 because of the spacing which was imparted to them by the guide members 64. In order to cause the roller chains 60 to converge again into a tightly packed group which is closed in the transverse direction, convergence members are provided. Shown is a convergence member 66 which is a guide piece having an obliquely arranged sliding surface 67 on one side and guide rollers 68 revolving about axis perpendicular to the plane 61 on the other side. The guide pieces 66 and the guide rollers 68 engage the outermost roller chains 60 of the group urging them inward and acting to funnel them into a closely packed group. As illustrated on FIG. 1, funneling takes place in the travel direction 65. After passing the convergence members 66 and 68 the roller chains 60 again are immediately adjacent to each other.

FIG. 3 illustrates a continuous press in which the present invention is utilized. As illustrated, and as more fully described in the aforementioned U.S. patent, this press includes an upper conveyor belt 1 of sheet steel which runs in an endless path over rollers or drums 5 and 6 disposed transverse to the web. Also shown is a lower conveyor belt 2 also made of sheet steel which runs over the drums 11 and 12. The conveyor belts 1 and 2 are driven by means of the drums.

The conveyor belts 1 and 2 run through the machine in the direction indicated by the arrows 16 with the material 4' which is to be pressed, and which is applied by means not shown, to the righthand side of FIG. 3. This material 4' is drawn into the pressure section designated generally as 3. After compression therein, the compressed web 4 is removed from the lefthand side of the press by apparatus also not shown. Within the pressure section 3 an upper support structure 17 is disposed inside the conveyor belt 1. It cooperates with a support structure 18 disposed inside the lower conveyor belt 2 to apply pressure to the areas of the conveyor belts 1 and 2 facing the web thereby pressing it against the web 4 and applying this pressure with a great degree of force over the area 3.

The support structures 17 and 18 each comprise a plurality of individual beams 19 or 20 which are arranged opposite each other above and below the conveyor belts 1 and 2 and the web 4. Each pair of beams 19 and 20 is clamped together laterally outside the web to form individual pressure members closed on themselves. Disposed between the beams 19 and 20 and the conveyor belts 1 and 2 are, respectively, heavy plates 26 which transmit the force exerted by the individual pressure members 19 and 20 evenly over the area of the conveyor belts 1 and 2. Also within these heavy plates are channels in which heater elements are arranged or through which a heating medium is conducted.

Between the sides of the plates 26 and 27 facing each other and the conveyor belts 1 and 2, roller chains 60 are disposed. The conveyor belts 1 and 2 opposite the plates 26 and 27 roll on these roller chains. The roller chains revolve endlessly about the plates 26 and 27 in a vertical longitudinal plane. The rollers of the roller chain 60 transmit both the pressure and the heat of the plates 26 and 27 to the conveyor belts 1 and 2 and thus to the web 4.

When the roller chains have arrived at the end of the pressure section 3 they are returned to the beginning of the pressure section within the area of the support structure. This is shown in a schematic fashion on FIG. 3 and is shown in more detail in FIGS. 4–6. In these latter figures, only one of the plates 26 or 27 is shown in each case. It will be recognized that the arrangement associated with one plate will also be present on the other side of the web.

As illustrated, the plates 26 and 27 include a heating and support plate 43 and a separate return plate 44. The plate 43 contains heating canals 40 which have their ends connected by means of pipe elbows 45 to form a closed conduction path through which the heating medium is pumped. An intermediate heat insulating plate 42 is disposed between the return plate 44 and the beams 19 or 20 so as to inhibit the flow of heat into the support structures 17 and 18. The plate 43 is flat on its underside. Between this underside and the conveyor belt 1, the roller chains 60 run. In this region they are immediately adjacent to each other. This area is the pressure section or working section. Each of the roller chains 60 consists of three rollers per link with the outer rollers cantilevered. Connecting straps are arranged between the links of each chain. At the lateral boundaries of the plate 43, the guide pieces 66 described in connection with FIGS. 1 and 2 are attached to urge the roller chains 60 in the lower working section to form a closely packed lateral group. (See particularly FIG. 4). Because FIG. 4 is a cross-sectional view, only a small part of the guide piece 66 is visible thereon. A view of that piece looking upward in the direction of the arrow, IV*a* is shown on FIG. 4*a*. As is evident, therefrom, the shape of this guide structure essentially corresponds to the guide structure 66 of FIG. 1.

Since the roller chains 60 are immediately adjacent to each other, they cannot be returned in a single plane within the return plate 44. Otherwise, there would be no structure remaining to transmit the force from the beams 19 to the heating and support plate 43. Because of this, the return plate 44 is more than twice as thick as the diameter of the rollers of the roller chains 60 and return slots 47 are provided on the side facing the beam 19 and additional return slots 48 on the side facing the upper side of the plate 43. The slots 47 and 48 are staggered with respect to each other in a transverse direction. The force is transmitted by the area 51 in between which occurs because of the thickness of the plate 44 exceeding twice the roller diameter. While the roller chains 60 are immediately adjacent each other in the working region, they are caused to have a certain lateral spacing in the region of the return plate 44. This is brought about in the return plate 44 by means of the lands 64 between the individual slots 47 and 48, respectively. It will be noted, that since these lands 64 perform the function shown by the guide members 64 of FIGS. 1 and 2 they have been given the same designation. Thus, the lateral boundary surfaces 49 and 50 of the roller chains 60 no longer lie exactly on top of each other but have the spacing mentioned above which need be only relatively small. On FIGS. 4 and 6 this small spacing is designated as 70.

At the ends of the plates 26 and 27, shaped pieces 52 are provided to deflect the roller chains 60 from the undersides of the plates to the upper side and vice versa. For adjacent roller chains 60, the shaped pieces 52 have different deflection radii so that the roller chains 60 are guided into the respective slots 47 and 48 which are at different heights in the plate 44. The point 63 at which the roller chains which have been in two different planes in the region of the return plate 44 again merge into a common plane is indicated on FIG. 5 at the outside of the shaped piece 52. Because the roller chains 60 have been spaced apart in the forming plate 44, the lateral edges of the roller chain 60 can not run up onto each other. Such is evident particularly from the view of FIG. 6.

FIGS. 7 to 10 illustrate in more detail the design of the exit side of the return plate 44. FIG. 7 is a front view of the re-entry end, i.e. the end shown on FIG. 5, without the chains. FIG. 8 is a plan view of the same area showing in more detail the construction of the guide members 64. As is more clearly illustrated on FIG. 9, which is an enlarged cross sectional view of the area encircled on FIG. 7, the slots 47 and 48 are formed by shaped pieces which are bolted together. As shown, a plurality of guide members 64 are bolted to a base to obtain the spacing 70 shown on FIG. 9. Further details of the construction are illustrated by the cross sectional view of FIG. 10 which is taken along the line X—X of FIG. 7. This shows how the chains are guided from the plate 44 onto the shaped pieces 52. As illustrated, an oblique shaped piece 71 is bolted to the end of the plate 44 and conducts the roller chains 60 from the upper slots 47 onto the shaped piece 52. In between the roller chains 60, which come out of the slots 48, the shaped pieces 71 are connected to each other and covered by a bar 72 which extends transversely across the exit of the return plate 44.

I claim:

1. In apparatus in which a group of roller chains are disposed, packed closely together, side by side, and in such a manner that they can advance independently of each other, the group being disposed to advance in one area parallel to each other in a common plane, with at least some of the roller chains leaving the common plane at one point and re-entering the plane again, the improvement comprising guide means disposed so as to separate any chain which has left the common plane by a predetermined spacing from chains adjacent thereto before re-entering the common plane, and convergence means following said guide means for urging the chains transversely together until said roller chains reach close proximity at the point where said chains reenter said common plane.

2. Apparatus according to claim 1 wherein said guide means comprise stationary guide bodies having lateral guide surfaces.

3. Apparatus according to claim 1 wherein said convergence means comprise guide pieces disposed on both sides of said group of chains, said guide pieces engaging the outermost roller chains of said group of chains.

4. Apparatus according to claim 1 wherein said convergence means comprise guide rollers disposed on both sides of the group of chains, said guide rollers being disposed for rotation on an axis perpendicular to the plane of said group of chains, the outermost roller chains of said group of chains rolling against said guide rollers.

5. Apparatus according to claim 1 in combination with a press to exert pressure on a longitudinal section of an advancing web in which the web is conducted between endless conveyor belts which revolve therewith in the forward travel direction of the web and extend over the width of the web with a support structure provided inside the endless conveyor belts both above and below the web with said chains disposed between said conveyor belts and said support structures, said group of chains comprising a plurality of mutually independent roller chains which advance while close packed transversely to the web in the direction of travel, said group of chains having a width which is constant in a forward direction and transmitting the pressure from said support structure to said conveyor belts, said chains being returned within the support structure in two channels arranged in two separate planes parallel to the plane of the web from the end to the beginning of the pressure section, said guide members being arranged to separate to a predetermined spacing the chains being returned in said two separate planes before said chains come together again at the beginning of said pressure section.

* * * * *